(12) United States Patent
Yeom

(10) Patent No.: US 12,709,325 B2
(45) Date of Patent: Aug. 18, 2026

(54) STEERING SYSTEM

(71) Applicant: HL MANDO CORPORATION, Gyeonggi-do (KR)

(72) Inventor: Seulki Yeom, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 419 days.

(21) Appl. No.: 18/202,868

(22) Filed: May 26, 2023

(65) Prior Publication Data

US 2024/0034395 A1 Feb. 1, 2024

(30) Foreign Application Priority Data

Jul. 27, 2022 (KR) ........................ 10-2022-0093443

(51) Int. Cl.
*B62D 5/06* (2006.01)
*B62D 1/20* (2006.01)
(Continued)

(52) U.S. Cl.
CPC ............... *B62D 5/064* (2013.01); *B62D 1/20* (2013.01); *B62D 5/0403* (2013.01); *B62D 5/062* (2013.01);
(Continued)

(58) Field of Classification Search
CPC .......... B62D 5/064; B62D 1/20; B62D 5/091; B62D 5/092; B62D 5/0421; B62D 5/24; B62D 5/0403; B62D 5/062; B62D 5/20; F16H 57/038; F16H 57/0493; F16H 57/12; B60Y 2400/70; B60Y 2410/10; B60Y 2410/102
See application file for complete search history.

(56) References Cited

U.S. PATENT DOCUMENTS 1,787,342 A * 12/1930 Flowers .................... B60P 1/10
74/89.35
2,181,425 A * 11/1939 Delaval-Crow ....... B62M 17/00
74/417
(Continued)

FOREIGN PATENT DOCUMENTS

JP 2001349385 A * 12/2001
JP 2005-162084 6/2005

OTHER PUBLICATIONS

Office Action dated Jan. 9, 2026 for Korean Patent Application No. 10-2022-0093443 and its English translation provided by Applicant's foreign counsel.

*Primary Examiner* — Timothy Wilhelm
(74) *Attorney, Agent, or Firm* — WOMBLE BOND DICKINSON (US) LLP

(57) ABSTRACT

The present disclosure relates to a steering system for a vehicle, and a steering system according to an embodiment of the present disclosure includes a motor configured to assist a steering force by rotating a steering shaft, a first bevel gear coupled to a motor shaft of the motor, a first lock nut configured to fix the first bevel gear to the motor shaft, a second bevel gear configured to engage with the first bevel gear, a housing coupled to the motor and configured to accommodate the first bevel gear and the second bevel gear, the housing having a motor shaft support configured to support an end of the motor shaft, and a first bearing interposed between the motor shaft and the motor shaft support.

20 Claims, 4 Drawing Sheets

(51) Int. Cl.
*B62D 5/04* (2006.01)
*B62D 5/09* (2006.01)
*B62D 5/20* (2006.01)
*B62D 5/24* (2006.01)
*F16H 57/038* (2012.01)
*F16H 57/04* (2010.01)
*F16H 57/12* (2006.01)

(52) U.S. Cl.
CPC ............. *B62D 5/091* (2013.01); *B62D 5/092* (2013.01); *B62D 5/20* (2013.01); *F16H 57/038* (2013.01); *F16H 57/0493* (2013.01); *F16H 57/12* (2013.01); *B60Y 2400/70* (2013.01); *B60Y 2410/10* (2013.01); *B60Y 2410/102* (2013.01); *B62D 5/0421* (2013.01); *B62D 5/24* (2013.01)

(56) References Cited

U.S. PATENT DOCUMENTS 2,183,667 A * 12/1939 Buckendale ........... B60K 17/04 74/420
RE23,550 E * 9/1952 Staude ................... B62D 5/043 74/388 R
3,968,705 A * 7/1976 Amano ................... F16H 35/10 408/11
4,004,830 A * 1/1977 Belke ........................ B60S 9/08 280/763.1
RE30,487 E * 1/1981 Belke ........................ B60S 9/08 280/763.1
4,318,304 A * 3/1982 Lang ................... F16H 25/2021 74/412 TA
4,376,401 A * 3/1983 Borzym ................. B23D 25/04 83/628
4,593,781 A * 6/1986 Galtier ................. B62D 5/0448 180/444
4,694,925 A * 9/1987 Roberts ................ B62D 5/0427 180/444
4,899,622 A * 2/1990 Kobayashi ............. B60K 17/08 74/400
5,029,659 A * 7/1991 Saito .................... B62D 5/0412 180/443
5,165,495 A * 11/1992 Fujii .................... B62D 5/0409 180/444
5,240,445 A * 8/1993 Aoki ...................... B63H 25/16 440/58
5,445,237 A * 8/1995 Eda ...................... B62D 5/0409 180/444
5,531,408 A * 7/1996 Wechselberger ......... B61L 5/02 246/291
5,819,871 A * 10/1998 Takaoka ................. B62D 5/043 192/37
5,916,325 A * 6/1999 Madrid ..................... F16D 7/10 464/37
5,971,094 A * 10/1999 Joshita ................... B62D 5/043 403/372
6,155,376 A * 12/2000 Cheng .................. B62D 5/0421 180/444
6,547,029 B2 * 4/2003 Peppler .................. B62D 5/092 180/443
6,629,578 B2 * 10/2003 Saruwatari ............. F16H 55/20 180/444
6,817,437 B2 * 11/2004 Magnus ................. B62D 5/006 180/443
6,848,534 B2 * 2/2005 Toyofuku ................. H02K 7/06 180/443
6,854,556 B1 * 2/2005 Yamamoto ............ F16D 1/0835 180/443
6,889,795 B2 * 5/2005 Shibata ................ B62D 5/0421 180/444
7,159,690 B2 * 1/2007 Murakami ........... B62D 5/0448 180/444
7,172,051 B2 * 2/2007 Nagamatsu .......... B62D 5/0448 180/443
7,175,558 B2 * 2/2007 Puiu ........................ F16D 28/00 475/225
7,604,085 B2 * 10/2009 Osuka .................. B62D 5/0403 180/428
7,610,828 B2 * 11/2009 Wingett ................ B64C 13/505 244/99.2
8,066,091 B2 * 11/2011 Ito ........................... B62D 5/30 180/406
8,104,567 B2 * 1/2012 Murakami ........... B62D 5/0421 180/443
8,397,859 B2 * 3/2013 Asakura ............... B62D 5/0448 180/444
9,108,666 B2 * 8/2015 Pesch ................... B62D 5/0409
9,347,535 B1 * 5/2016 Sheahan, Jr. ........... F16D 11/16
10,119,609 B2 * 11/2018 Takahashi ................. F16H 1/14
10,793,183 B2 * 10/2020 Harter, Jr. ................ B62D 3/14
11,149,829 B2 * 10/2021 Matsuto ................... H02K 7/06
12,187,359 B2 * 1/2025 Park ....................... B62D 5/043
2003/0047374 A1 * 3/2003 Peppler ................ B62D 5/0421 180/443
2004/0069559 A1 * 4/2004 Iwasa .................. B62D 5/0448 180/443
2009/0038876 A1 2/2009 Ito et al.

* cited by examiner

STEERING SYSTEM

CROSS-REFERENCE TO RELATED APPLICATIONS

This application claims benefit and priority to Korean Patent Application No. 10-2022-0093443, filed on Jul. 27, 2022, with the Korean Intellectual Property Office, the disclosure of which is incorporated herein in its entirety by reference.

TECHNICAL FIELD

The present disclosure relates to a steering system, and more particularly, to a steering system for a vehicle, which assists a steering force when a driver operates a steering wheel.

BACKGROUND

In general, a steering system for a vehicle refers to an apparatus that enables a driver to intentionally change a traveling direction of a vehicle, i.e., an apparatus that assists the driver in arbitrarily changing rotation centers, about which front wheels of the vehicle rotate, and allowing the vehicle to travel in a desired direction.

Meanwhile, a power-assisted steering system refers to an apparatus capable of easily changing the traveling direction of the vehicle with a smaller effort by assisting a steering wheel operating force made by the driver by using a booster device when the driver operates a steering wheel of the vehicle.

The power-assisted steering systems are broadly classified into an electric power steering system (EPS) and a hydraulic power steering system (HPS).

The hydraulic power steering system refers to a steering system, in which when an oil pump connected to a rotary shaft of an engine supplies a working fluid to an operation cylinder connected to a rack bar, a piston of the operation cylinder, which receives the working fluid, moves and assists a steering operating force, thereby enabling the driver to perform a steering operation with a small effort.

The electric power steering system refers to a steering system that includes a motor instead of the oil pump and the operation cylinder and assists an operating force for the steering wheel by using a force of the motor.

In the case of the steering system used for the vehicle in the related art, because a desired output value cannot be achieved by an output of the electric power steering system applied to a truck or bus that requires a relatively higher steering force than a passenger vehicle, a hydraulic power steering system with high-output specifications is used. However, because no control device is provided in the hydraulic power steering system, there is a problem in that it is impossible to use an automatic parking function, a lane-keeping function, an autonomous driving function, and the like using the control device.

Therefore, a steering system made by integrating the hydraulic power steering system and the electric power steering system has been developed to use additional functions such as an automatic parking function, a lane-keeping function, a trailer back-up assistance function, a traveling assistance function according to a road surface state, a steering vibration attenuation function, and an autonomous driving control function, which control the vehicle regardless of the driver's intention to perform the steering operation, even in the case of a truck or bus that requires a relatively higher steering force than a passenger vehicle.

However, when the hydraulic power steering system and the electric power steering system are integrated, an overall structure of the integrated steering system is complicated and increased in size, which causes problems in that an installation space required for the steering system is increased, and it is not easy to manufacture and maintain the integrated steering system.

SUMMARY

The present disclosure has been made in an effort to provide a steering system capable of simplifying a structure, reducing a weight of the structure, minimizing a required installation space, and effectively manufacturing and maintaining the structure.

An embodiment of the present disclosure provides a steering system including: a motor configured to assist a steering force by rotating a steering shaft; a first bevel gear coupled to a motor shaft of the motor; a first lock nut configured to fix the first bevel gear to the motor shaft; a second bevel gear including a gear main body configured to engage with the first bevel gear, and an input shaft extending from the gear main body and connected to the steering shaft; a housing coupled to the motor and including a first bevel gear accommodation portion configured to accommodate the first bevel gear, and a second bevel gear accommodation portion formed in a direction intersecting the first bevel gear accommodation portion and configured to accommodate the gear main body of the second bevel gear and at least a part of the input shaft, the housing having a motor shaft support formed in the first bevel gear accommodation portion and configured to support an end of the motor shaft; and a first bearing interposed between the motor shaft and the motor shaft support.

The housing may be modularized in a state in which the second bevel gear is accommodated in the second bevel gear accommodation portion, and when the modularized housing is coupled to the motor in a state in which the first bevel gear is fixedly coupled to the motor shaft, the motor shaft may be supported by the motor shaft support, and the first bevel gear and the second bevel gear may engage with each other.

The first bearing may include a needle bearing.

The steering system may further include a bevel gear set penetrated by the input shaft of the second bevel gear and inserted into the second bevel gear accommodation portion of the housing together with the second bevel gear. Further, the bevel gear set may be screw-coupled to the housing and installed to adjust backlash between the second bevel gear and the first bevel gear.

The steering system may further include a second bearing interposed between the bevel gear set and the input shaft of the second bevel gear.

The second bearing may include one of or both a ball bearing and a needle bearing.

The steering system may further include a snap ring coupled to the input shaft of the second bevel gear and configured to support the second bearing.

The steering system may further include a housing cover coupled to the housing and configured to cover the bevel gear set and the second bevel gear accommodated in the second bevel gear accommodation portion, in which an end of the input shaft of the second bevel gear protrudes while penetrating the housing cover.

The steering system may further include an oil seal provided in one region corresponding to the housing and inserted between the bevel gear set and the input shaft of the second bevel gear.

The steering system may further include a second lock nut configured to fix the bevel gear set to the housing.

Another embodiment of the present disclosure provides a steering system including: a hydraulic assistive steering power device configured to assist a steering force by being operated by hydraulic pressure of a working fluid; an electric assistive steering power device coupled to the hydraulic assistive steering power device and having a motor configured to assist the steering force by rotating a steering shaft; a first bevel gear coupled to a motor shaft of the motor; a first lock nut configured to fix the first bevel gear to the motor shaft; a second bevel gear including a gear main body configured to engage with the first bevel gear, and an input shaft extending from the gear main body and connected to the steering shaft; a housing coupled to the motor and including a first bevel gear accommodation portion configured to accommodate the first bevel gear, and a second bevel gear accommodation portion formed in a direction intersecting the first bevel gear accommodation portion and configured to accommodate the gear main body of the second bevel gear and at least a part of the input shaft, the housing having a motor shaft support formed in the first bevel gear accommodation portion and configured to support an end of the motor shaft; and a first bearing interposed between the motor shaft and the motor shaft support.

The motor shaft may be supported by the motor shaft support and the first bevel gear and the second bevel gear may engage with each other when the housing is coupled to the motor in a state in which the first bevel gear is fixedly coupled to the motor shaft in a state in which the second bevel gear is accommodated in the second bevel gear accommodation portion of the housing.

The first bearing may include a needle bearing.

The steering system may further include a bevel gear set penetrated by the input shaft of the second bevel gear and inserted into the second bevel gear accommodation portion of the housing together with the second bevel gear. Further, the bevel gear set may be screw-coupled to the housing and installed to adjust backlash between the second bevel gear and the first bevel gear.

The steering system may further include a second bearing interposed between the bevel gear set and the input shaft of the second bevel gear.

The second bearing may include one of or both a ball bearing and a needle bearing.

The steering system may include a snap ring coupled to the input shaft of the second bevel gear and configured to support the second bearing.

The steering system may further include a housing cover coupled to the housing and configured to cover the bevel gear set and the second bevel gear accommodated in the second bevel gear accommodation portion, in which an end of the input shaft of the second bevel gear protrudes while penetrating the housing cover.

The steering system may further include an oil seal provided in one region corresponding to the housing and inserted between the bevel gear set and the input shaft of the second bevel gear.

The steering system may further include a second lock nut configured to fix the bevel gear set to the housing.

The steering system according to the embodiment of the present disclosure may simplify the structure and reduce the weight of the structure, thereby minimizing the required installation space, and effectively manufacturing and maintaining the structure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
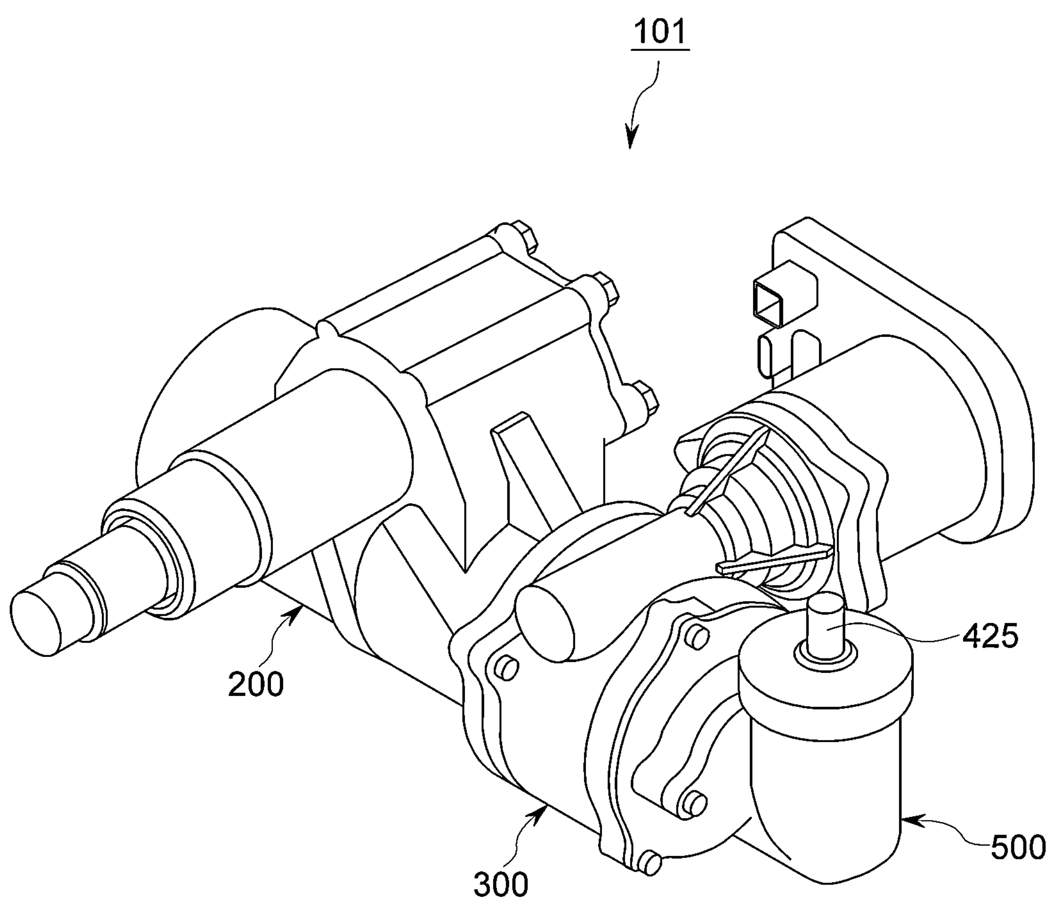
FIG. 1 is a perspective view of a steering system according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, a steering system 101 according to an embodiment of the present disclosure will be described with reference to FIGS. 1 to 4.

As illustrated in FIG. 1, the steering system 101 according to the embodiment of the present disclosure includes an electric assistive steering power device 300 that rotates an input shaft of a hydraulic assistive steering power device 200. Therefore, even though a driver does not directly perform a steering operation, the driver may use additional functions such as an automatic parking function, a lane-keeping function, a trailer back-up assistance function, a traveling assistance function according to a road surface state, a steering vibration attenuation function, and an autonomous driving control function, which control the vehicle regardless of the driver's intention to perform the steering operation, even in the case of a truck or bus that requires a relatively higher steering force than a passenger vehicle. Therefore, it is possible to improve convenience for the driver.

Figure 2:
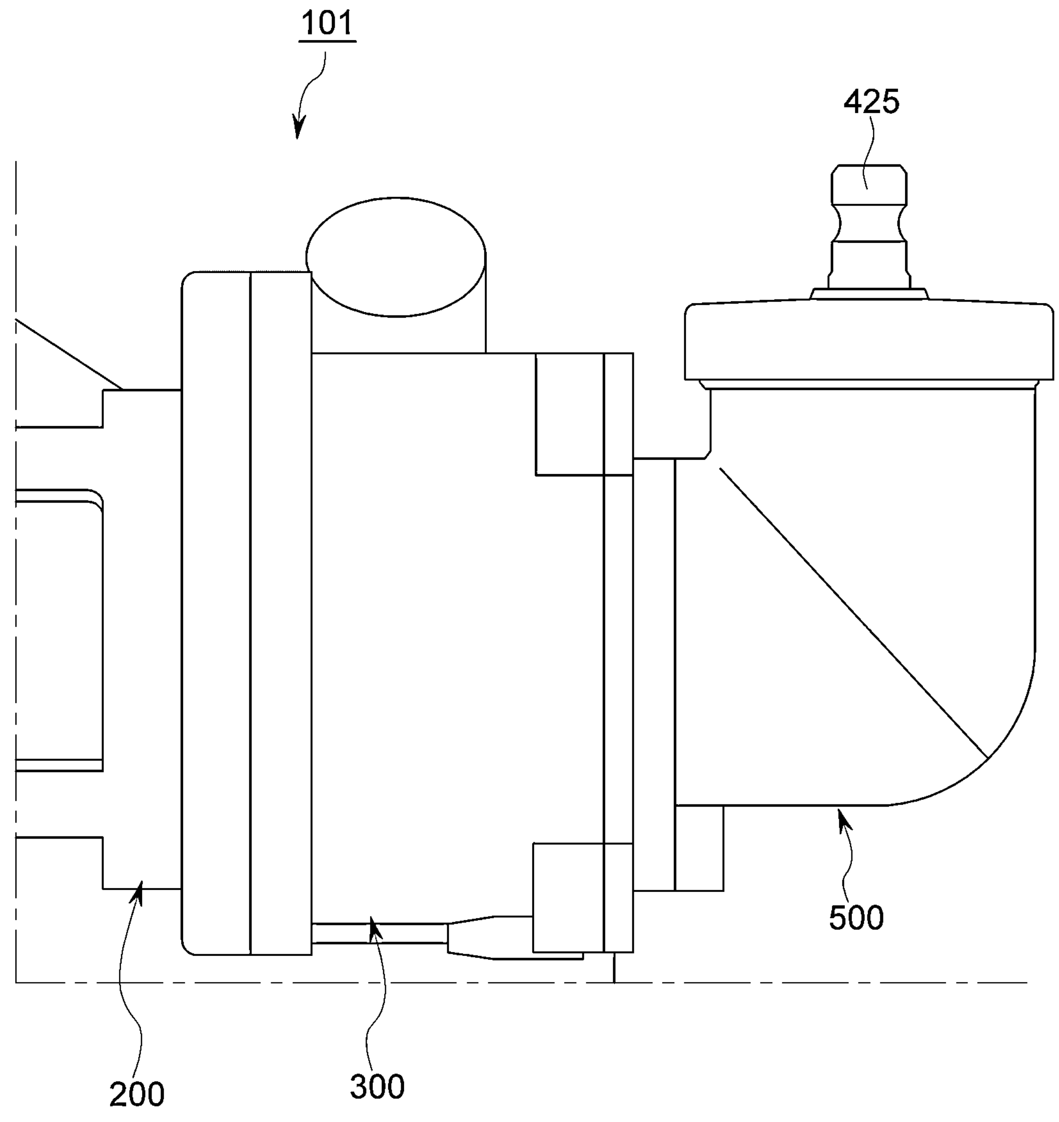
FIG. 2 is a front view illustrating a part of the steering system in FIG. 1.
Figure 3:
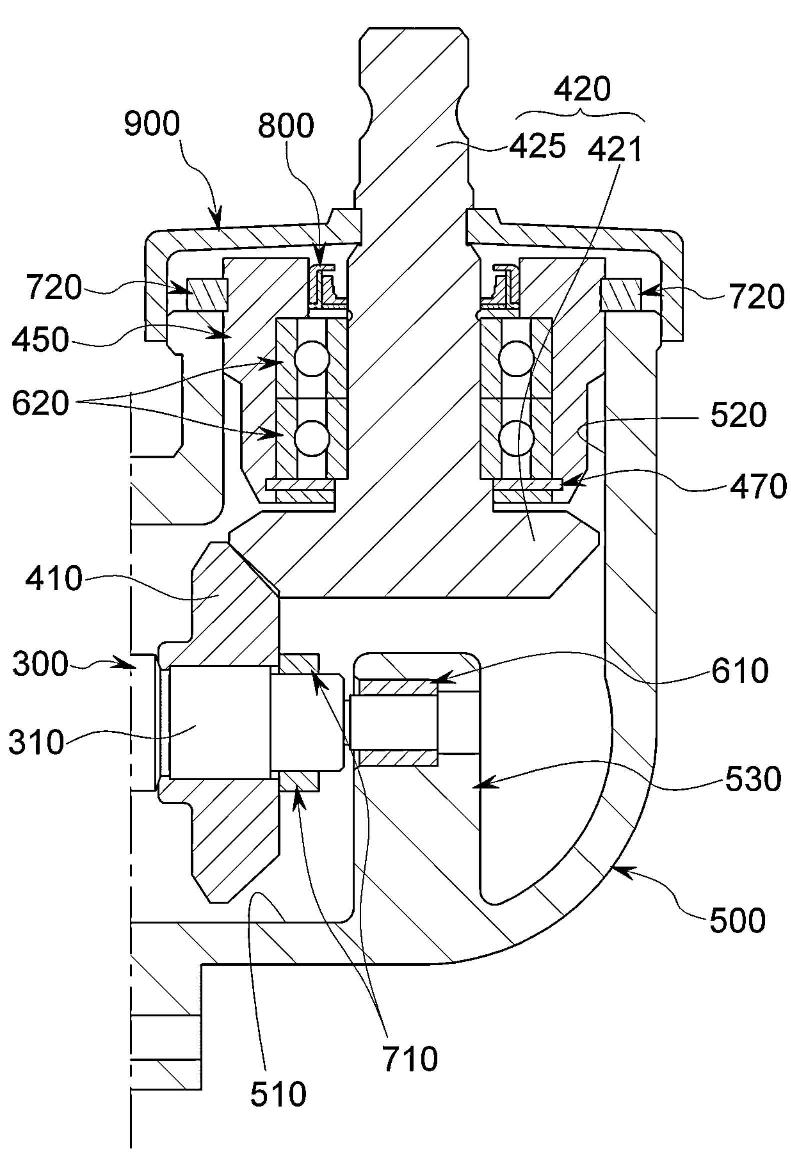
FIG. 3 is a cross-sectional view illustrating an interior of a housing used for the steering system in FIG. 1.
Figure 4:
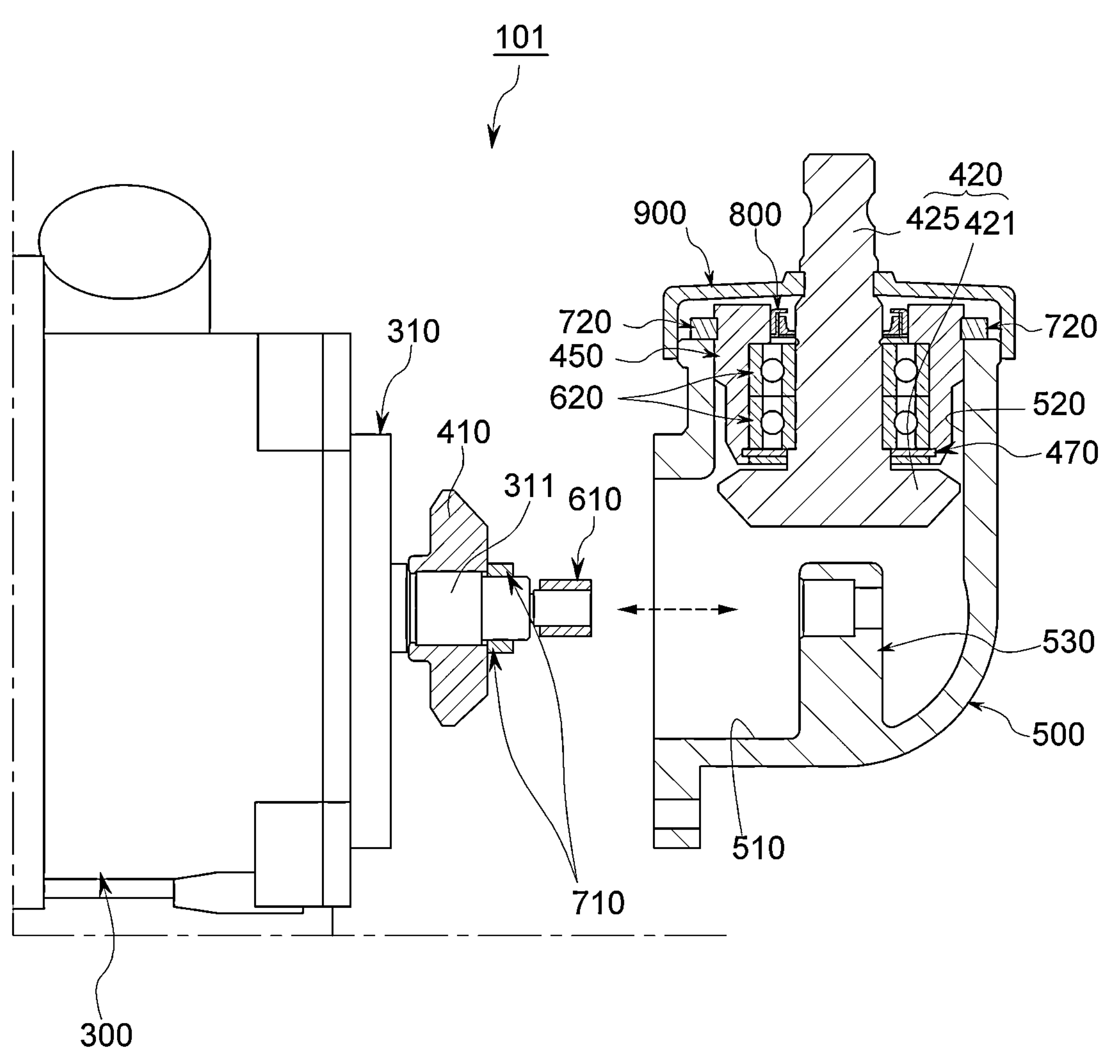
FIG. 4 is a view illustrating a state in which the housing used for the steering system in FIG. 1 is separated.

Specifically, as illustrated in FIGS. 2 and 3, the steering system 101 according to the embodiment of the present disclosure includes the hydraulic assistive steering power device 200, the electric assistive steering power device 300, a first bevel gear 410, a first lock nut 710, a housing 500, and a first bearing 610.

The steering system 101 according to the embodiment of the present disclosure may further include a second bevel gear 420, a bevel gear set 450, a second bearing 620, a snap ring 470, a housing cover 900, an oil seal 800, and a second lock nut 720.

The hydraulic assistive steering power device 200 assists a steering force by being operated by hydraulic pressure of a working fluid. For example, in the hydraulic assistive steering power device 200, a flow path is changed by a rotation of a steering shaft, and the working fluid is introduced into a cylinder, such that a rack bar is slid, and a wheel is steered.

The electric assistive steering power device 300 assists the steering force by rotating the steering shaft by using a motor 310, in a direction identical to a direction in which the steering wheel is rotated by the driver, in response to a control signal inputted from a control device (not illustrated).

In this case, the electric assistive steering power device 300 may be coupled to and integrated with the hydraulic assistive steering power device 200. That is, the steering shaft, the electric assistive steering power device 300, and the hydraulic assistive steering power device 200 are connected in this order, such that power may be transmitted, and the steering system 101 may steer the wheel.

As described above, because the steering system 101 according to the embodiment of the present disclosure includes both the hydraulic assistive steering power device 200 and the electric assistive steering power device 300, the steering system 101 may not only provide a high output but also perform functions such as an automatic parking function, a lane-keeping function, and an autonomous driving function using the control device.

The first bevel gear 410 is coupled to a motor shaft 311 of the motor 310.

The first lock nut 710 fixes the first bevel gear 410 coupled to the motor shaft 311.

As described above, in the embodiment of the present disclosure, the first bevel gear 410 is assembled directly to the motor shaft 311 of the motor 310 and fixed by the first lock nut 710.

The housing 500 accommodates the first bevel gear 410 while being coupled to the motor 310 or the electric assistive steering power device 300 and has therein a motor shaft support 530 configured to support an end of the motor shaft 311.

Specifically, the housing 500 may include a first bevel gear accommodation portion 510 configured to accommodate the first bevel gear 410, and a second bevel gear accommodation portion 520 formed in a direction intersecting the first bevel gear accommodation portion 510. Further, the motor shaft support 530 may be formed in the first bevel gear accommodation portion 510.

The first bearing 610 is disposed between the motor shaft 311 and the motor shaft support 530 of the housing 500. For example, the first bearing 510 may be a needle bearing.

The second bevel gear 420 may be inserted into the second bevel gear accommodation portion 520 of the housing 500.

Specifically, the second bevel gear 420 may include a gear main body 421 configured to engage with the first bevel gear 410, and an input shaft 425 extending from the gear main body 421 and protruding to the outside of the housing 500, the input shaft 425 being connected to the steering shaft. That is, the housing 500 may accommodate the entire gear main body 421 of the second bevel gear 420 and at least a part of the input shaft 425. Therefore, a rotational force of the steering shaft is transmitted to the first bevel gear 410 through the input shaft 425 of the second bevel gear 420 and transmitted to the motor shaft 311 of the motor 310 coupled to the first bevel gear 410.

Therefore, the motor 310 of the electric assistive steering power device 300 may assist the received steering force or create a steering force even in a state in which the motor 310 cannot receive a steering force. Then, the motor 310 may transmit the steering force to the hydraulic assistive steering power device 200. Further, the wheel is steered by a high steering force created by the hydraulic assistive steering power device 200 by using a force of hydraulic pressure.

The second bevel gear 420 may be accommodated in the second bevel gear accommodation portion 520 of the housing 500 while being kept supported by the bevel gear set 450 to be described below.

The bevel gear set 450 may be accommodated in the second bevel gear accommodation portion 520 of the housing 500 while supporting the second bevel gear 420. Specifically, the bevel gear set 450 may be penetrated by the input shaft 425 of the second bevel gear 420 and inserted into the second bevel gear accommodation portion 520 of the housing 500 together with the second bevel gear 420.

The bevel gear set 450 may be screw-coupled to the housing 500 and installed to adjust backlash between the second bevel gear 420 and the first bevel gear 410. That is, screw threads may be formed on an outer surface of the bevel gear set 450 and an inner surface of the housing 500, which face each other, and coupled while engaging with one another.

The second bearing 620 may be interposed between the bevel gear set 450 and the input shaft 425 of the second bevel gear 420. For example, the second bearing 620 may be configured as one of or both a ball bearing and a needle bearing. That is, the second bearing 620 may be configured as a ball bearing or a combination of a ball bearing and a needle bearing.

The snap ring 470 may be coupled to the input shaft 425 of the second bevel gear 420 and support the second bearing 620. The snap ring 470 prevents the second bearing 620 from separating from an exact position and assists the second bearing 620 in supporting the input shaft 425 of the second bevel gear 420 so that the input shaft 425 is rotatable.

The housing cover 900 may be coupled to the housing 500 and cover the bevel gear set 450 and the second bevel gear 420 accommodated in the second bevel gear accommodation portion 520. In addition, a hole may be formed in a central region of the housing cover 900, so that the end of the input shaft 425 of the second bevel gear 420 may protrude while penetrating the hole.

The housing cover 900 may prevent foreign substances from being introduced into the second bevel gear accommodation portion 520 of the housing 500. In addition, the housing cover 900 is separately coupled to the housing 500. When the housing cover 900 is separated, the bevel gear set 450 and the second bevel gear 420 inserted into the second bevel gear accommodation portion 520 of the housing 500 may be taken out.

The oil seal 800 may be provided in one region corresponding to the housing 500 and inserted between the bevel gear set 450 and the input shaft 425 of the second bevel gear 420. To smoothly rotate the first bevel gear 410 and the second bevel gear 420, lubricating oil may be supplied to the first bearing 610 and the second bearing 620. The oil seal 800 prevents the lubricating oil supplied into the housing 500 from leaking.

The second lock nut 720 may fix the bevel gear set 450 to the housing 500. As described above, the bevel gear set 450 may be screw-coupled to the housing 500 while supporting the second bevel gear 420 and adjust the backlash between the second bevel gear 420 and the first bevel gear 410. The second lock nut 720 may prevent the bevel gear set 450 from unnecessarily and arbitrarily moving.

Meanwhile, in the embodiment of the present disclosure, the housing 500 may be modularized in a state in which the second bevel gear 420, the bevel gear set 450, and the second bearing 620 are accommodated in the second bevel gear accommodation portion 520 and the housing cover 900 is coupled. Further, when the modularized housing 500 is coupled to the motor 310 in the state in which the first bevel gear 410 is fixedly coupled to the motor shaft 311, the motor shaft 311 may be supported by the motor shaft support 530, and the first bevel gear 410 and the second bevel gear 420 may engage with each other.

That is, the first bevel gear 410 and the second bevel gear 420 may be simply connected only by an operation of coupling the modularized housing 500 to the motor 310. The first bevel gear 410 and the second bevel gear 420 may be disconnected only by an operation of separating the modularized housing 300 from the motor 310.

As described above, it is possible to simplify the structure and reduce the weight of the structure by coupling the first bevel gear 410 to the motor shaft 311 and packaging several components in the housing 500. Therefore, it is possible to not only minimize the required installation space but also effectively manufacture and maintain the structure.

It is possible to easily adjust the backlash between the second bevel gear 420 and the first bevel gear 410 by opening the housing cover 900 and rotating the bevel gear set 450 screw-coupled to the housing 500.

With the above-mentioned configuration, the steering system 101 according to the embodiment of the present disclosure may simplify the structure and reduce the weight of the structure, thereby minimizing the required installation space, and effectively manufacturing and maintaining the structure.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A steering system comprising:

a motor configured to assist a steering force by rotating a steering shaft;

a first bevel gear coupled to a motor shaft of the motor;

a first lock nut configured to fix the first bevel gear to the motor shaft;

a second bevel gear comprising a gear main body configured to engage with the first bevel gear, and an input shaft extending from the gear main body and connected to the steering shaft;

a housing coupled to the motor and comprising a first bevel gear accommodation portion configured to accommodate the first bevel gear, and a second bevel gear accommodation portion formed in a direction intersecting the first bevel gear accommodation portion and configured to accommodate the gear main body of the second bevel gear and at least a part of the input shaft, the housing having a motor shaft support formed in the first bevel gear accommodation portion and configured to support an end of the motor shaft; and a first bearing interposed between the motor shaft and the motor shaft support, wherein the first lock nut is positioned between the first bevel gear and the first bearing.

2. The steering system of claim 1, wherein the housing is modularized in a state in which the second bevel gear is accommodated in the second bevel gear accommodation portion, and wherein when the modularized housing is coupled to the motor in a state in which the first bevel gear is fixedly coupled to the motor shaft, the motor shaft is supported by the motor shaft support, and the first bevel gear and the second bevel gear engage with each other.

3. The steering system of claim 1, wherein the first bearing comprises a needle bearing.

4. The steering system of claim 1, further comprising:

a bevel gear set penetrated by the input shaft of the second bevel gear and inserted into the second bevel gear accommodation portion of the housing together with the second bevel gear, wherein the bevel gear set is screw-coupled to the housing and installed to adjust backlash between the second bevel gear and the first bevel gear.

5. The steering system of claim 4, further comprising:

a second bearing interposed between the bevel gear set and the input shaft of the second bevel gear.

6. The steering system of claim 5, wherein the second bearing comprises one of or both a ball bearing and a needle bearing.

7. The steering system of claim 4, further comprising:

a housing cover coupled to the housing and configured to cover the bevel gear set and the second bevel gear accommodated in the second bevel gear accommodation portion, wherein an end of the input shaft of the second bevel gear protrudes while penetrating the housing cover.

8. The steering system of claim 4, further comprising:

an oil seal provided in one region corresponding to the housing and inserted between the bevel gear set and the input shaft of the second bevel gear.

9. The steering system of claim 4, further comprising:

a second lock nut configured to fix the bevel gear set to the housing.

10. The steering system of claim 1, further comprising:

a snap ring coupled to the input shaft of the second bevel gear and configured to support the second bearing.

11. A steering system comprising:

a hydraulic assistive steering power device configured to assist a steering force by being operated by hydraulic pressure of a working fluid;

an electric assistive steering power device coupled to the hydraulic assistive steering power device and having a motor configured to assist the steering force by rotating a steering shaft;

a first bevel gear coupled to a motor shaft of the motor;

a first lock nut configured to fix the first bevel gear to the motor shaft;

a second bevel gear comprising a gear main body configured to engage with the first bevel gear, and an input shaft extending from the gear main body and connected to the steering shaft;

a housing coupled to the motor and comprising a first bevel gear accommodation portion configured to accommodate the first bevel gear, and a second bevel gear accommodation portion formed in a direction intersecting the first bevel gear accommodation portion and configured to accommodate the gear main body of the second bevel gear and at least a part of the input shaft, the housing having a motor shaft support formed in the first bevel gear accommodation portion and configured to support an end of the motor shaft; and a first bearing interposed between the motor shaft and the motor shaft support, wherein the first lock nut is positioned between the first bevel gear and the first bearing.

12. The steering system of claim 11, wherein the motor shaft is supported by the motor shaft support and the first bevel gear and the second bevel gear engage with each other when the housing is coupled to the motor in a state in which the first bevel gear is fixedly coupled to the motor shaft in a state in which the second bevel gear is accommodated in the second bevel gear accommodation portion of the housing.

13. The steering system of claim 11, wherein the first bearing comprises a needle bearing.

14. The steering system of claim 11, further comprising:

a bevel gear set penetrated by the input shaft of the second bevel gear and inserted into the second bevel gear accommodation portion of the housing together with the second bevel gear, wherein the bevel gear set is screw-coupled to the housing and installed to adjust backlash between the second bevel gear and the first bevel gear.

15. The steering system of claim 14, further comprising:

a second bearing interposed between the bevel gear set and the input shaft of the second bevel gear.

16. The steering system of claim 15, wherein the second bearing comprises one of or both a ball bearing and a needle bearing.

17. The steering system of claim 14, further comprising:

a housing cover coupled to the housing and configured to cover the bevel gear set and the second bevel gear accommodated in the second bevel gear accommodation portion, wherein an end of the input shaft of the second bevel gear protrudes while penetrating the housing cover.

18. The steering system of claim 14, further comprising:

an oil seal provided in one region corresponding to the housing and inserted between the bevel gear set and the input shaft of the second bevel gear.

19. The steering system of claim 14, further comprising:

a second lock nut configured to fix the bevel gear set to the housing.

20. The steering system of claim 11, further comprising:

a snap ring coupled to the input shaft of the second bevel gear and configured to support the second bearing.

* * * * *